United States Patent [19]
Beinhaur

[11] 3,897,088
[45] July 29, 1975

[54] SEALING BOOT

[75] Inventor: Ernest Lloyd Beinhaur, Harrisburg, Pa.

[73] Assignee: AMP Incorporated, Harrisburg, Pa.

[22] Filed: Dec. 12, 1973

[21] Appl. No.: 423,943

[52] U.S. Cl. ................................ 285/97; 277/34.3
[51] Int. Cl.² ................... F16L 17/00; F16L 33/16
[58] Field of Search ............ 277/34, 34.3, 225, 226; 285/DIG. 19, 235, 369, 96, 97, 417

[56] References Cited
UNITED STATES PATENTS

| | | | |
|---|---|---|---|
| 943,023 | 12/1909 | Johnson | 285/97 X |
| 2,141,645 | 12/1938 | Fawick | 285/97 X |
| 2,306,160 | 12/1942 | Freyssinet | 285/97 X |
| 2,523,716 | 9/1950 | Parr | 285/369 X |
| 3,828,116 | 8/1974 | Lonow | 277/34.3 X |

*Primary Examiner*—Geo. V. Larkin
*Attorney, Agent, or Firm*—Russell J. Egon

[57] ABSTRACT

A sealing boot is disclosed for effecting an environmental tight seal on conduits, cables, and the like. The subject sealing boot is made from a gas tight inflatable material, such as rubber, and can be applied to seal the juncture of two conduits, cables, or the like, or to seal a free end of a conduit, cable, or the like. The embodiment intended for sealing a juncture or splice of a conduit, cable or the like is somewhat similar to an inner tube in that it has a toroidal configuration when inflated. However, it has a substantially flat cylindrical configuration when deflated. Means are integral with the boot to restrict its transverse cross sectional expansion as it is inflated. This restriction means can include thicker annular bands around the boot, a web or mesh of material integral with the boot, or a helical member of high tensile strength integral with the boot. The embodiment of the boot intended for use in sealing the free end of a conduit, cable, or the like is a cylindrical member of gas tight material, such as rubber, having one end permanently closed and the opposite end adapted to be opened.

7 Claims, 15 Drawing Figures

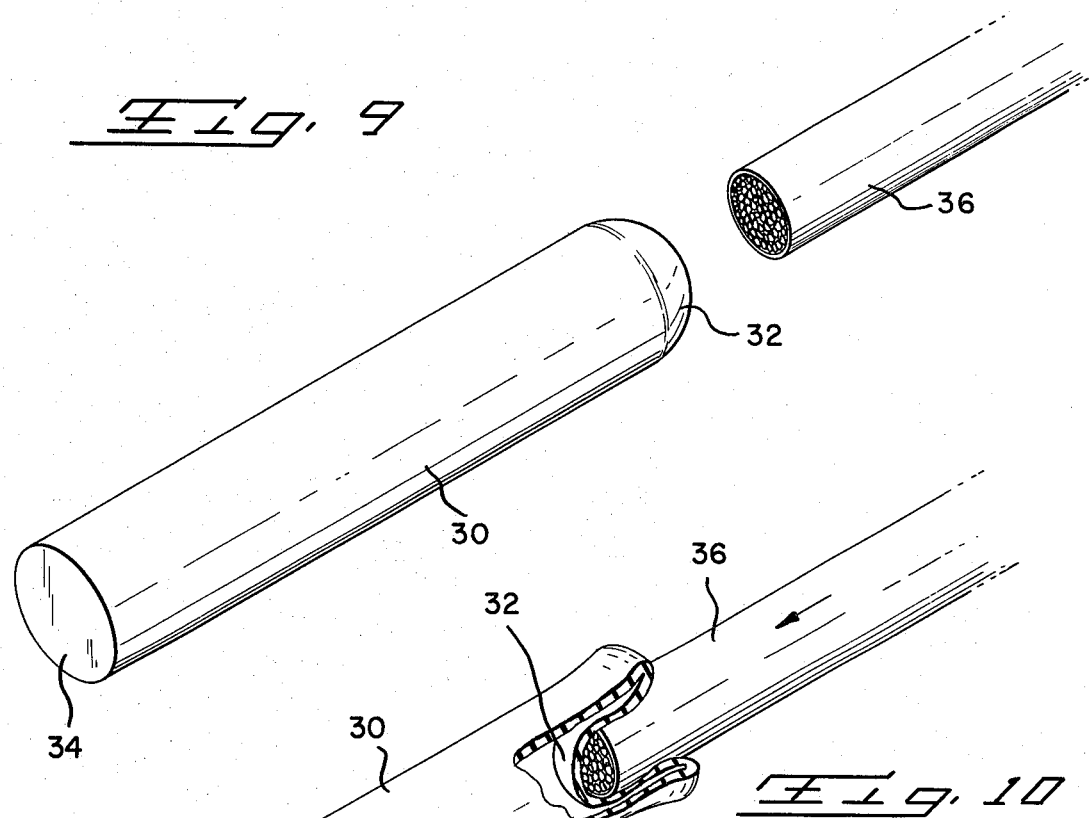

SEALING BOOT

BACKGROUND OF THE INVENTION

1. The Field Of The Invention

The present invention relates to an improved boot for sealing the junction of conduits, cables, and the like or for sealing a free end of a conduit, cable, or the like and in particular to an inflatable sealing boot.

2. The Prior Art

There are many instances when it is highly desirable to have an environmentally tight seal on either the end of or a joint in a conduit, cable or the like. For example, it clearly is desirable to have joints of fluid carrying conduits sealed in order to prevent escape of the fluid being conveyed by the conduits. Likewise it is necessary, in a fluid system, to seal off free ends of conduits, which free ends may be included in a system to accommodate future expansion, in order to operate the system at its current state. Thus the seal must be able to withstand a certain amount of pressure originating from the sealed conduit. There also are instances when such seals must be capable of standing up under vibration, such as plumbing drain systems in mobile homes.

In almost every instance of making an electrical connection, with either individual wires or entire cables, it is essential to have the connection protected from the environment. The protection may be accomplished in many fashions, depending upon factors such as the intended environment, the size of the connection, etc. Usually insulation in either sleeve or wrap form is positioned over the connection.

While most known seals of the above mentioned types are permanent seals, it is frequently desirable to have a sealing arrangement which can be removed, without destruction, so that the joint or connection can be inspected, repaired, or replaced.

One commonly used type of seal is formed of a thermo-plastic material. This type of seat is expanded by the application of heat, positioned over the joint and allowed to cool and contract to form a tight seal. Sometimes this type of seal can be removed by reheating it until it expands once again. However, this type of seal cannot always be used; for example, in an environment filled with explosive gases it would not be possible to use heat without extreme danger.

SUMMARY OF THE INVENTION

The present invention relates to a sealing boot for effecting a removable environmental tight seal on joints or free ends of conduits, cables, and the like. The sealing boot is an inflatable member formed of gas tight material. In one embodiment the boot has a flattened cylindrical configuration in a deflated state and a doughnut or toroidal configuration in an inflated state. Means integral with the boot restrict its transverse cross sectional diameter as it is inflated whereby continued inflation of the member causes an enlargement of only the outer and inner diameters of the toroid.

It is therefore an object of the present invention to produce a sealing boot which can be inflated under low pressure to assume a toroidal configuration of sufficient size to enable it to be positioned on or removed from a conduit, cable, or the like and will, in a deflated condition, tightly sealingly engage the outer peripheral surface of the conduit, cable or the like.

It is another object of the present invention to produce a sealing boot which can be used to seal the juncture of a conduit, cable, or the like from all environmental conditions, including vibration, without losing the sealing effect.

It is yet another object of the present invention to produce a sealing boot which is inflatable and can be easily positioned on and removed from a conduit, cable or the like for ease of effecting replacement, repair or other work on the conduit, cable or the like.

It is a further object of the present invention to produce an inflatable sealing boot which can be used to provide an environmental tight seal on the free end of a conduit, cable, or the like and which can be readily removed therefrom when desired.

It is a still further object of the present invention to produce an inflatable sealing boot which can be readily and economically manufactured.

The means for accomplishing the foregoing and other objects and advantages of the invention will become apparent from the following detailed description taken with reference to the accompanying drawings.

BRIEF DESCRIPTION OF THE DRAWINGS

FIG. 9 is a perspective view of the subject end sealing boot aligned with the fragmentary end of a cable;

FIG. 10 is a perspective view, partially in section, of the end sealing boot in initial engagement with the free end of a cable;

FIG. 11 is a perspective view, partially in section, of the end sealing boot after the boot has begun to be reversed upon itself;

FIG. 12 is a perspective view showing the end sealing boot fully mounted on the cable;

DETAILED DESCRIPTION OF THE SUBJECT INVENTION

Figure 1:
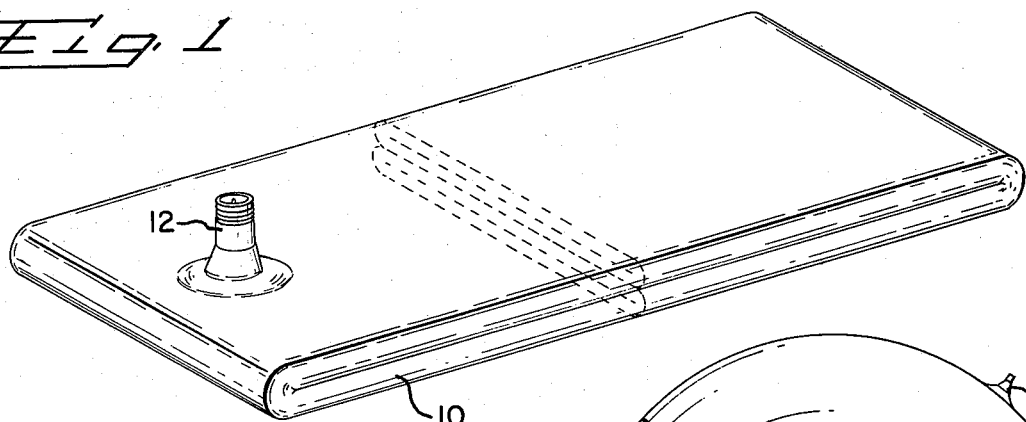
FIG. 1 is a perspective view of the subject joint sealing boot in a deflated condition.

The subject joint sealing boot is shown in FIGS. 1 to 8 and is intended for sealing a joint between abutting ends of an object, such as a conduit, cable, or the like. The sealing boot itself is somewhat similar to a conventional inner tube in that it comprises an endless, double walled, flat band member 10 formed from inflatable material, such as rubber, with a valve means 12 permanently fixed thereon. The subject joint sealing boot, in an inflated condition, has a toroid or doughnut configuration, with an initial inner diameter A smaller than the object to be sealed. In the deflated state, as shown in FIG. 1, the boot has a flattened configuration in order to form a seal of substantial transverse width.

The subject sealing boot is preferably produced in a manner quite similar to the production of conventional inner tubes for automotive tires or reinforced garden hose. The rubber material is extruded as an endless hollow tube, which is then cut into segments of the desired length. The ends of the segment are folded together to form a butt joint which is sealed by suitable means. A valve means is attached and the completed boot is heat cured in its flattened condition by a conventional process.

Figure 3:
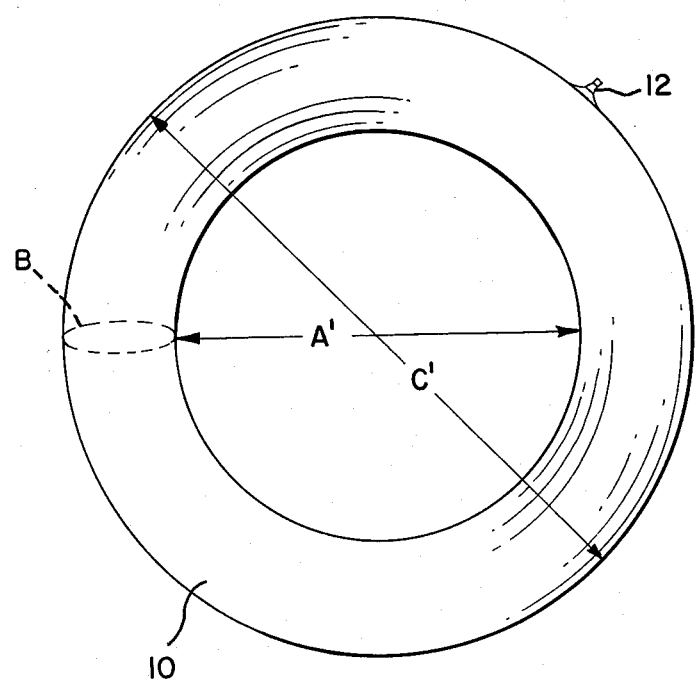
FIG. 3 is an elevational view, similar to FIG. 2, showing the joint sealing boot in a further or fully inflated condition.
Figure 4:
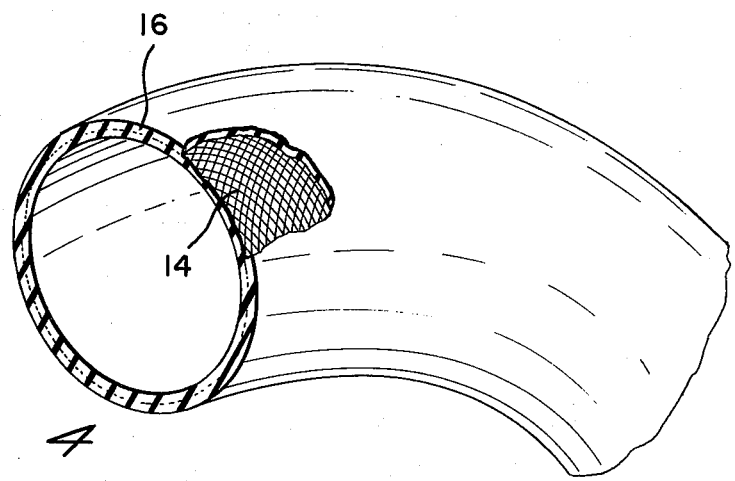
FIG. 4 is a perspective view partially in section and with portions removed, showing a fragment of a first embodiment of the subject joint sealing boot.
Figure 5:
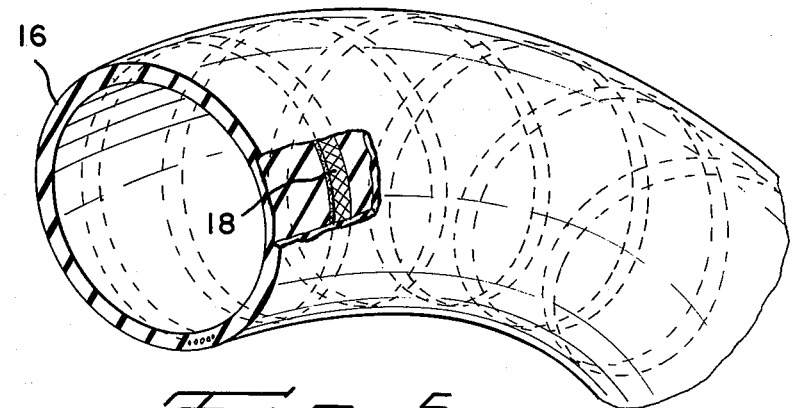
FIG. 5 is a perspective view partially in section and with portions removed, showing a fragment of a second embodiment of the subject joint sealing boot.
Figure 6:
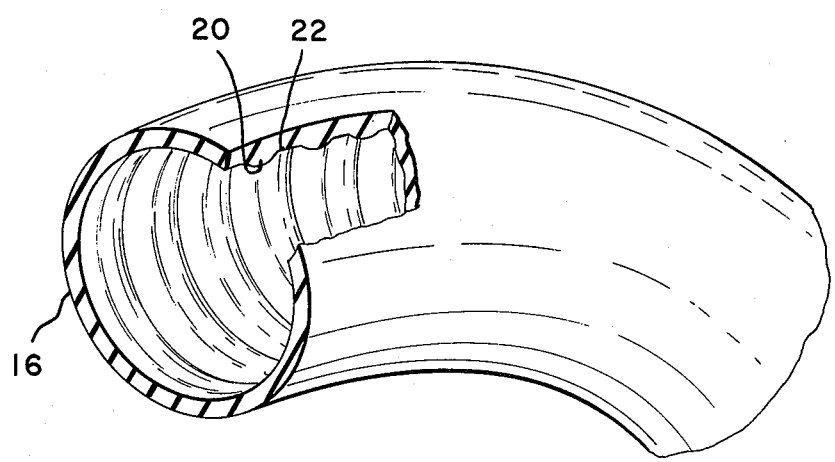
FIG. 6 is a perspective view, partially in section and with portions removed showing a fragment of a third embodiment of the subject joint sealing boot.

The subject sealing boot includes, as shown in FIGS. 4 to 6, reinforcing means which restrict the transverse cross sectional expansion B (see FIGS. 2 and 3) of the sealing boot as the boot is inflated. In FIG. 4, the reinforcement means comprises an endless web or mesh of reinforcement material 14 which is integral with the rubber tube 16. Preferably the reinforcement is embedded in the rubber tube 16 as it is extruded. The web or mesh 14 is a rather loose assembly of cords having high tensile strength, such as nylon or the like. This embodiment resembles reinforced garden hose. The sealing boot of FIG. 5 includes a helical member 18 also integral with the rubber tube 16 and preferably is extruded with the rubber material to be encased therein. The helical member 18 can be a belt or band of material having high tensile strength, such as a belt of nylon webbing. The joint sealing boot shown in FIG. 6 is formed with a plurality of parallel, closely spaced annular bands 20 of greater thickness than the remaining sealing boot. These bands 20 can be formed by pulses during extrusion of the tube 16 an serve to restrict the transverse cross sectional expansion of the subject boot during inflation since the bands will not stretch as readily as the thinner intermediate areas 22.

Figure 2:
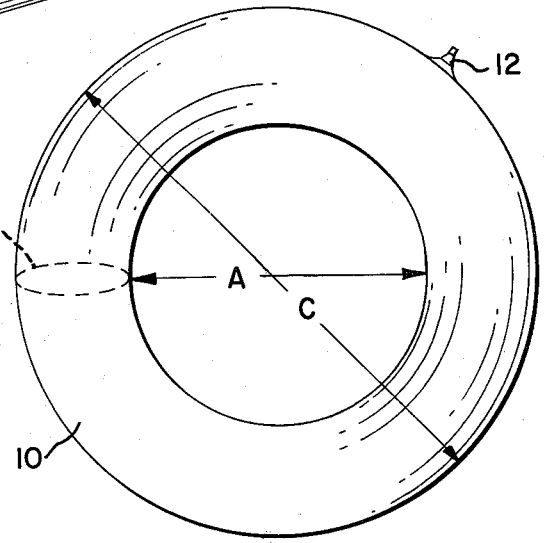
FIG. 2 is an elevational view showing the joint sealing boot of FIG. 1 in an initially or partially inflated condition.
Figure 7:
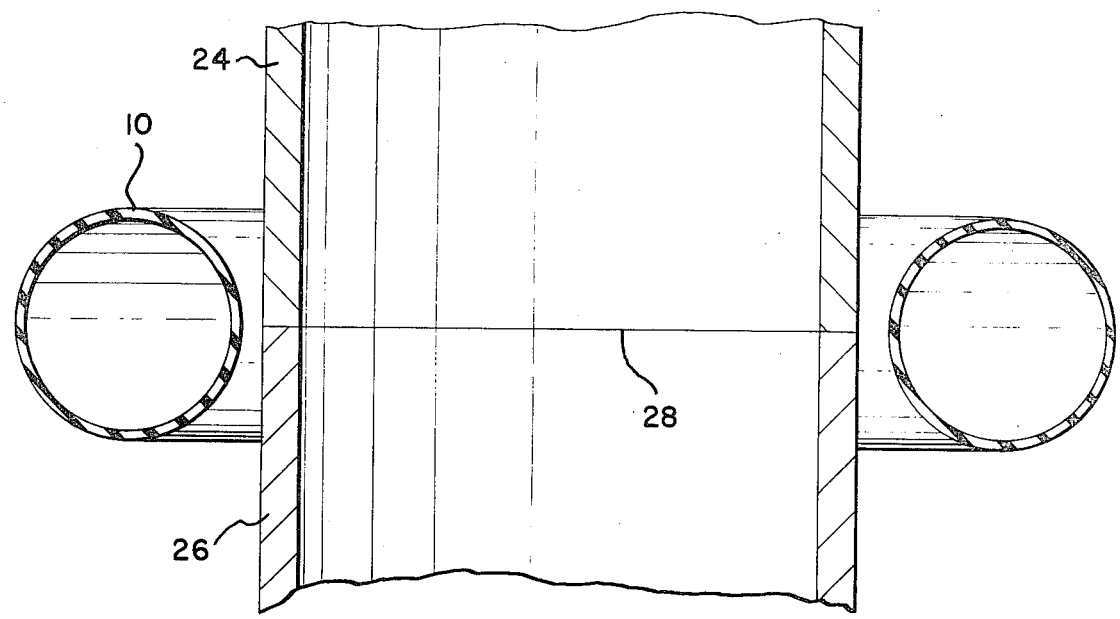
FIG. 7 is a section view through a butt joint of two conduit fragments and the subject boot showing the inflated boot being positioned with respect to the conduit joint.
Figure 8:
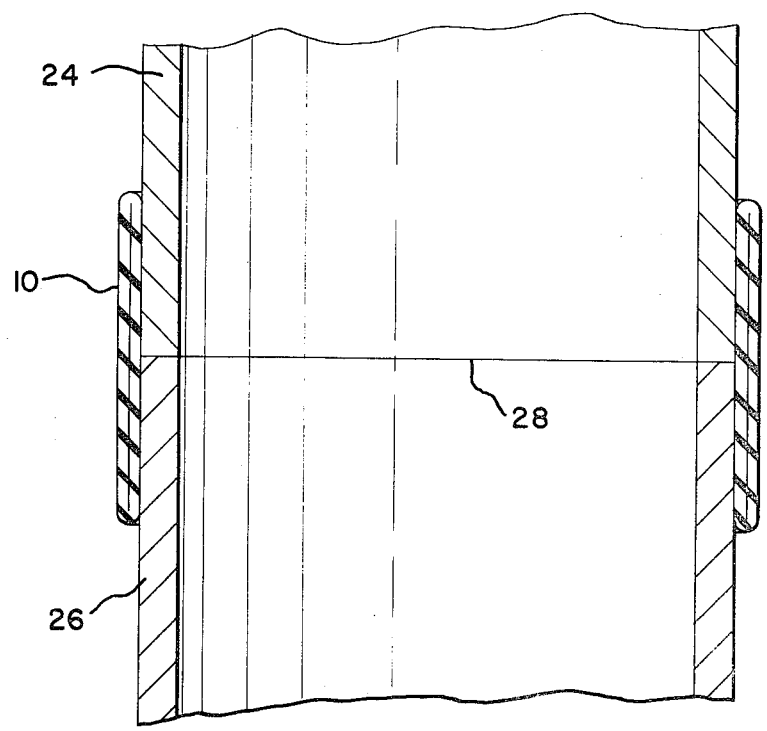
FIG. 8 is a section view similar to FIG. 7 showing the subject boot sealingly engaging the butt joint of the conduit.

Referring now to FIGS. 2 and 3, the subject joint sealing boot will assume a toroidal or doughnut configuration when inflated as shown in FIG. 2. The initial interior diameter A will be less than the outer diameter of the conduit, cable, or the like which is to be sealed. The transverse cross sectional diameter B quickly reaches its maximum dimension and is restrained from further expansion by the above described reinforcement means. FIG. 3 shows the sealing boot after being inflated until inner diameter A' allows the boot to slide loosely over the conduit, cable, or the like which is to be sealed. It will be noted from a comparison of FIGS. 2 and 3, that, contrary to a conventional inner tube, as the subject boot is inflated, the interior diameter of the boot A' has substantially increased while the transverse cross sectional diameter B has remained the same. When a conventional inner tube is inflated, there is an increase in the outer diameter and a decrease in the inner diameter because the transverse cross sectional diameter of the tube also increases. In the subject sealing boot, the interior diameter A—A' increases along with the exterior diameter C—C' because the cross sectional diameter B of the sealing boot is restricted. Thus as the boot is inflated, the interior diameter A grows to sufficient size that the boot can be easily slipped over a conduit 24, 26 as shown in FIG. 7. When the boot is properly positioned surrounding a joint 28, the valve 12 is opened to release the pressure from the sealing boot which will then delfate to sealingly engage upon the conduit 24, 26. Thus an effective seal is formed by the elastic memory of the boot causing it to return to its flattened condition, as shown in FIG. 8. The mounted boot 10 is under tension to form the tight seal.

The particular advantages of this joint sealing boot are that it can easily be inflated to be positioned on a conduit, cable, or the like and it can be reinflated at any time in order to inspect, repair, or replace the conduit, cable, or the like that is sealed by the boot. Further, the boot can be used in places where, for one reason or another, it is not advisable to use heat.

The end sealing embodiment of the subject boot is intended for sealing off the free end of a conduit, cable or the like and comprises a closed cylindrical member 30 having a permanently closed first end 32 and a temporarily closed 34 opposite end. The end sealing boot 30 is aligned with the end of, in this instance, a cable 36 and is sealed thereon by pushing the permanently closed first end 32 against the free end of the cable. As the first end 32 is forced reversedly into the cylindrical body, FIG. 10, it causes an increase in the air pressure therein, because of the decreasing volume, and forces the cylindrical member 30 to expand radially outwardly thereby accommodating the continued rearward movement of the first end 32. When the first end 32 engages the second end 34, the second end 34 is opened, as shown in FIG. 11. The cylindrical member is rolled out until it finally rests upon the cable 36 in an in-side-out condition, as shown in FIG. 12.

If it is intended to seal the end of the cable for only a temporary interval, then the second closed end need not be opened so that the end sealing boot can be readily removed from the cable. However, if the duration of the requirement for the seal cannot be foretold with any degree of accuracy, then the complete mounting procedure as shown in FIGS. 10 to 12 would be followed.

Figure 13:
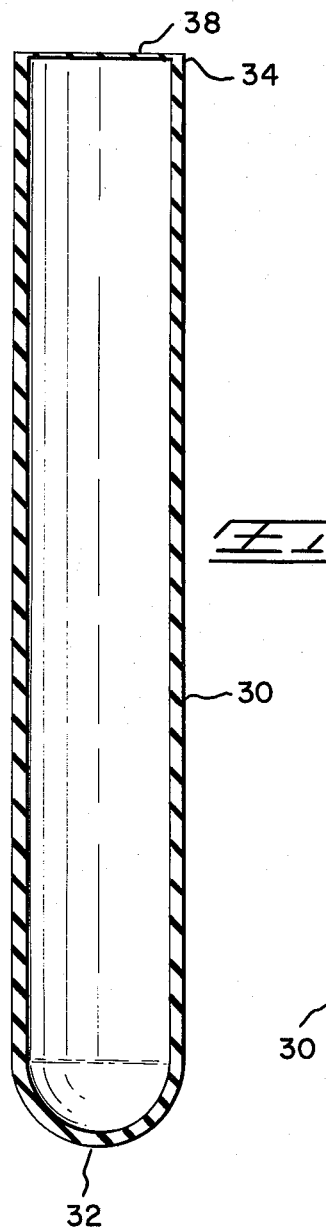
FIG. 13 is a longitudinal section through a first embodiment of the end sealing boot.
Figure 14:
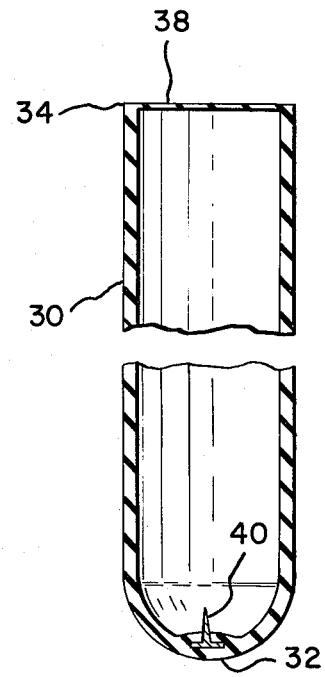
FIG. 14 is a foreshortened longitudinal section through a second embodiment of the end sealing boot.
Figure 15:
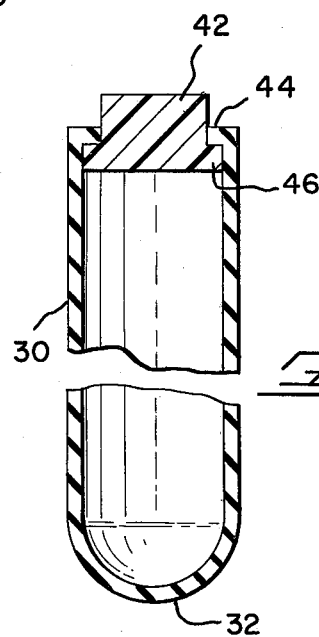
FIG. 15 is a foreshortened longitudinal section through a third embodiment of the end sealing boot.

The embodiment of the end sealing boot shown in the FIGS. 9 to 12 is shown in vertical longitudinal section in FIG. 13. This end sealing boot 30 is simply an elongated cylindrical member permanently closed at a first end 32 and temporarily closed at the second end by a frangible seal 38. The subject end sealing boot shown in FIG. 14, has a pointed member 40 fixed inside the member 30 at the first end 32 with the point directed towards the frangible seal 38 to assist in breaking the seal during the mounting of the boot on the cable. FIG. 15 shows a further alternate embodiment with a removable plug 42 held in the end of the cylindrical member 30 by an inwardly directed annular flange 44 on the cylindrical member 42 engaging an outwardly directed annular flange 46 on the plug 42. In this particular embodiment, when the pressure inside the end sealing boot has risen to a predetermined amount, the pressure will force the plug from the end of the boot. The plug is usually driven from the sealing boot with a certain amount of force which is neither dangerous nor undesirable.

From the foregoing it will be readily apparent that either of the joint or end embodiments of the subject sealing boot can be selectively positioned on a cable, conduit, or the like and sealed thereon for either making a permanent or a temporary seal. The operation of both boots depends upon the inflatability of the boot to enable it to be positioned upon the member to be sealed. It is the inherent properties of the sealing boot material which allow an environmental tight seal to be formed at the desired location.

As previously mentioned, the subject sealing boot can be used to effect a seal between abutting ends of a conduit or the like, which seal will accommodate a high number of vibrations without losing its sealing properties. Thus the subject sealing boot can be used not only for effectng an environmental tight seal for electrical conduits and connections, but it also can be used for a fluid tight seal for fluid carrying conduits, such as the plumbing conduits used in the mobile home industry wherein the conduits are subjected to an unusual amount of vibration during the transportation of the mobile home.

The present invention may be subject to many modifications and changes without departing from the spirit or essential characteristics thereof. The above described embodiments are therefore intended to be in all respects as illustrative and not restrictive of the scope of the invention.

What is claimed is:

1. A sealing boot for effecting an environmental tight seal on members, such as cables, conduits, and the like, said boot comprising:
   a closed annular unit of inflatable material capable of withstanding low internal pressures, said unit in a normal, relaxed, deflated state having an inner diameter less than the external diameter of said members;
   reinforcement means restricting the transverse cross-sectional inflation of said unit; and
   means to inflate and deflate said unit whereby said unit is initially inflated and subsequently deflated into sealing engagement with said member.

2. The sealing boot according to claim 1 wherein said unit comprises a normally flat, endless tube of inflatable material; and
   said means to inflate and deflate said unit comprises valve means fixed to said tube, whereby said tube can be inflated to a toroidal configuration.

3. A sealing boot according to claim 2 wherein said flat endless tube of inflatable material is a rubber material having said reinforcement means integral therewith.

4. A sealing boot according to claim 3 wherein said reinforcing means comprises a helical band of material having high tensile strength molded into the rubber material of said boot.

5. A sealing boot according to claim 3 wherein said reinforcing means comprises an annular web of material having high tensile strength molded into the rubber material of said boot.

6. A sealing boot according to claim 3 wherein said reinforcing means comprises a plurality of closely spaced, rings of substantially greater thickness than the remainder of the tube formed integrally along the length of the boot.

7. A sealing boot for effecting an environmental tight seal on a butt joint between two members, such as conduits, cables, and the like, said sealing boot comprising:
   an endless tube of inflatable material having a deflated flat cylindrical configuration and an inflated toroidal configuration, said tube in the deflated state having internal dimensions less than the external dimensions of said members;
   valve means fixed to said tube; and
   means integral with said tube restricting the maximum transverse cross-sectional dimension of the tube whereby upon inflation both the inner and outer diameters of the boot are increased while the transverse cross-sectional dimension remains the same so that said boot can be easily positioned over the joint to be sealed and deflated to form a tight seal on said joint.

* * * * *